W. BENSON.
DRIVING GEAR FOR TRACTION ENGINES.
APPLICATION FILED JAN. 13, 1909.
967,311.
Patented Aug. 16, 1910.
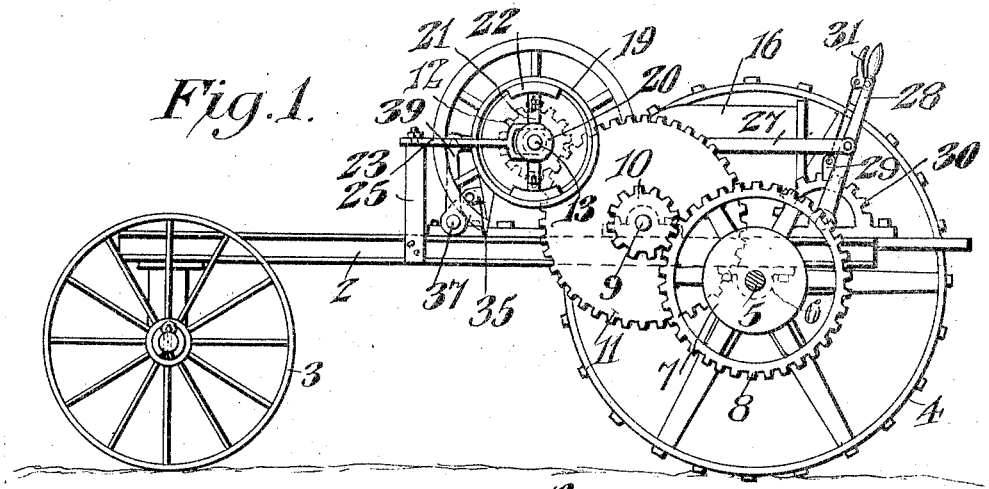
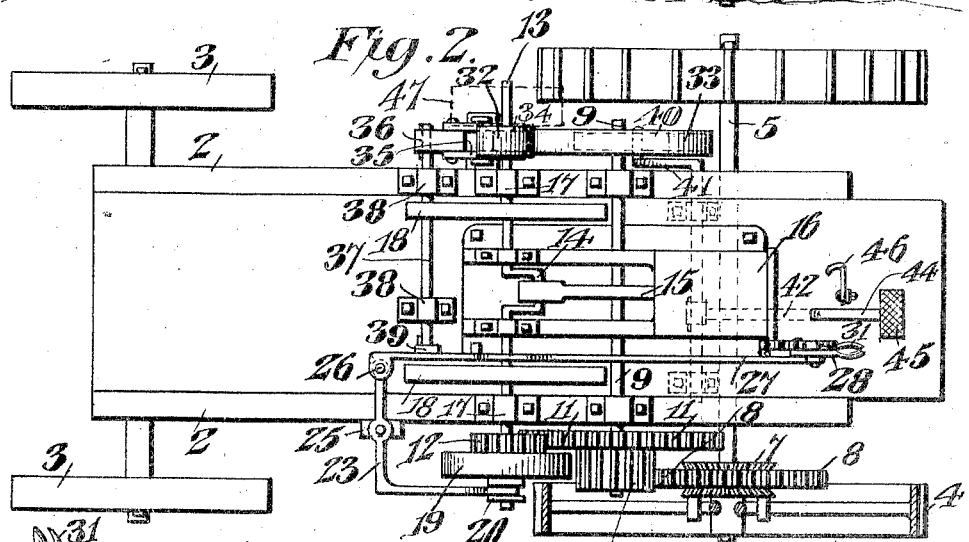
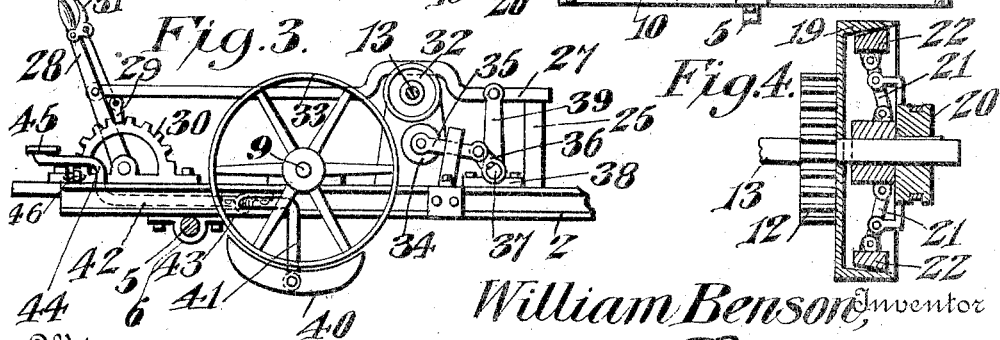
William Benson, Inventor
Witnesses

UNITED STATES PATENT OFFICE.

WILLIAM BENSON, OF BRECKENRIDGE, MICHIGAN.

DRIVING-GEAR FOR TRACTION-ENGINES.

967,311. Specification of Letters Patent. Patented Aug. 16, 1910.

Application filed January 13, 1909. Serial No. 472,117.

*To all whom it may concern:*

Be it known that I, WILLIAM BENSON, a citizen of the United States, residing at Breckenridge, in the county of Gratiot and State of Michigan, have invented a new and useful Driving-Gear for Traction-Engines, of which the following is a specification.

My invention relates to traction engines, and particularly to the gearing for driving, stopping and reversing the same, the object of my invention being to provide mechanism for this purpose which will furnish a toothed driving gear for movement in a forward direction, a frictional driving gear for transmitting the movement of the engine to reverse the movement of the truck, means for frictionally connecting the driving shaft of the engine with either the direct or reverse gears, and means whereby the engine itself may act as a brake when the truck is moving faster than the engine, as when running down hill.

Other objects are to permit the engine to be stopped or reversed with great quickness, and so simplify the gearing for this purpose that the operation of starting, stopping or reversing the truck may be accomplished by the actuation of one lever and without any danger of stripping the gears used for the direct drive.

Minor objects relate to the arrangement of my construction in a compact and simple manner upon the engine truck and to details of construction as stated in the accompanying specification and particularly set forth in the claims.

In the drawings, Figure 1 is a side elevation of a truck of a traction engine, with my improvements applied thereto; Fig. 2 is a plan view thereof; Fig. 3 is a fragmentary side elevation opposed to that in Fig. 1, showing the frictional gear used in reversing; Fig. 4 is a fragmental section showing the end of the driving shaft with the clutch thereon.

Like letters indicate corresponding parts in all the several views.

In the drawings, 2 denotes longitudinal beams forming the frame of a truck of any ordinary construction, supported at their forward ends upon the usual wheels, 3, and at their rear ends upon the usual cogged driving wheels 4. These wheels 4 are mounted upon an axle 5, which is carried in bearings 6 supported upon the bottom edges of the beams 2. The axle 5 preferably revolves freely within the bearings 6. Mounted upon the axle 5 to turn therewith and with the wheel 4 is an ordinary compensating gear 7, and a toothed wheel 8. The compensating gear used may be of any ordinary construction, and as it does not form part of my invention, it is not necessary to illustrate or further describe it.

Mounted in bearings upon the upper sides of the beams 2 is the shaft 9, carrying upon one end a friction wheel to be hereafter described, and upon the other a pinion 10, which is keyed thereto and adapted to intermesh with the toothed gear 8. Mounted upon the shaft 9 to turn therewith and with the pinion 10 is the toothed gear 11, which in turn engages with the pinion 12, loose upon the crank shaft 13. This crank shaft has in its length the crank 14, to which is connected the connecting rod 15 of any suitable piston contained within the usual cylinder 16 of an explosive engine.

While I have shown a single-cylinder engine as the motive power of the truck, I do not, of course, wish to be limited thereto, as I might use as many cylinders as desired.

The crank shaft 13 is supported in bearings 17 upon the upper face of the beams 2, or in any other desired manner, and carries the usual fly-wheels 18. Upon that end of the crank shaft which passes through the gear 12 is carried a clutch member 19, which forms part of or is connected to the gear 12 so that the said clutch member and the gear rotate together. Mounted upon the extremity of the shaft 13 is the other member 20 of the clutch adapted to slide in or out upon the shaft, but keyed or splined thereto so as to rotate therewith. This clutch member may be of any desired description so as to engage with the other member 19 of the clutch. I have shown it, however, as having projecting pivoted arms 21 which in turn are pivoted to the interior faces of clutch shoes 22. When the member 20 is forced in the clutch shoes are forced out and into engagement with the inside face of the clutch member 19. When the member 20 is drawn outward upon the shaft, the shoes 22 are withdrawn and it will be obvious that the shaft 13 will then be disconnected from the member 19 and from the gear 12. In order to actuate the clutch member 20, I provide the bell crank lever 23, pivoted upon a standard 25, attached to and projecting upward from one of the beams 2. The other end of the lever 23 is pivoted as at 26 to a longitudinal rearwardly-extending link, 27, which at its rear end is connected to an actuating handle, 28, which at its lower end is preferably pivoted upon the upper face of one of the beams 2, and carries a detent 29 adapted to engage with the teeth of an arc 30. The detent 29 is connected to the usual detent-actuating bell crank 31, pivoted to the upper end of the handle 28. The other end of the shaft 13 carries upon it a friction wheel 32, which is made of any suitable material adapted to have frictional engagement with other friction wheels, this wheel being usually made of paper or like composition. Fixed upon the end of the shaft 9 in line with the friction wheel 32 is the friction wheel 33, usually of metal. It will be seen from Fig. 3 that there is no engagement under ordinary circumstances between the wheel 32 and the wheel 33. In order to provide for this engagement and thus provide for a reversal of the truck I provide an intermediate friction wheel 34, preferably of paper or similar material, adapted to have good frictional contact with the wheel 32 and the wheel 33. This wheel 34 is mounted upon the end of an arm 35, the rear end of which is connected to a crank arm 36 projecting from the end of a shaft 37. This shaft is mounted in bearings 38 and carries at its other end an upwardly projecting arm 39, which is pivoted to the longitudinally extending rod 27. It will be obvious from Fig. 3 that if the lever 28 is thrown over in one direction, the intermediate wheel 34 will be interposed between and forced into engagement with the friction wheels 33, 32, and that power will be transmitted under these conditions from the wheel 32 to the wheel 33, but that with the parts in the position shown in Fig. 3, power will not be transmitted from the wheel 32 to the wheel 33, and the friction wheel 34 will be out of engagement with either of these wheels. The operation of this portion of the structure is obvious.

When it is desired to go ahead, the lever 28 is thrown forward. This turns the bell crank 23 and forces in the member 20 of the clutch, thus forcing out the toggle arms 21 and forcing the shoes 22 against the inside face of the clutch member 19. Power will thus be transmitted from the driving or crank shaft 13 to the gear 12. This gear will, of course, transmit its motion to the gears 11, 10 and 8, and to the axle 5, thus driving the rear wheels 4 forward. It will be seen that in this position the gearing is direct and positive. When, however, the lever 28 is drawn rearwardly to a middle position, the clutch member 20, with its arms and shoes 21 and 22, will be drawn out of engagement with the clutch member 19 and power will no longer be transmitted from the crank shaft to the driving wheels, 4. If the lever 28 is now moved to its rearmost position, the intermediate friction wheel 34 will be thrown into engagement with the wheels 32 and 33, and thus power from the crank shaft 13 will be transmitted from the wheel 32 to the wheel 34, and from this wheel to the wheel 33, this arrangement of friction wheels being such that the motion of the driving wheels 4 is reverse to what it was when the driving was being done through the gears 12, 11, 10 and 8. It will be evident from this that the mechanism may be quickly operated either for a direct drive in a forward direction, for disconnecting the driving wheels from the crank shaft entirely, or for driving the truck in a reverse direction, and that this shifting of the gears is accomplished by the operation of one convenient lever.

One of the main advantages incident to my invention is the fact that there is no liability of stripping the gears when the movement of the truck is reversed. In traction engines it often happens that the machine has to be brought to a very sudden stop, or that the reversing motion is to be applied with great quickness. In any device using gears for this purpose, there is great liability of the teeth being stripped therefrom, it being remembered that traction engines are very heavy and their momentum correspondingly great. It will be seen that by my connection there is a frictional engagement both between the reversing gears and the direct driving gears and the driving crank shaft. In the direct driving mechanism this frictional engagement is procured by the use of the friction clutch 19, 20. In the reversing mechanism this frictional engagement is obtained by the use of the friction wheels 32, 33, 34. Thus, no matter whether the machine is going forward or backward, a movement to reverse this machine will not bring any extra strain upon the teeth of the gears, but this will be taken up by the frictional engagement between the clutch members or between the friction wheels.

Another advantage of the construction which I have devised resides in the fact that the friction wheel 33, which, being geared through the shaft 9 to the axle 5, rotates with the axle, is braked against the friction wheel, 34, in case the truck is moving faster than the engine, as in going down hill. It will be seen in this case that the amount of this braking action will depend upon the pressure which is brought to bear to throw the wheel 34 into contact with the wheels 33 and 32, and that by throwing the lever 28 over with sufficient force, the wheel 34 may be forced inward with such strength that the wheel 33 will be positively rotated by the wheel 32 and thus the driving wheels 4 be regulated to the speed of the engine. Thus, by a very quick motion the machine may be braked by the engine or thrown out of engagement with the engine to release the braking action. It is this ability to reverse the movement of the truck, to release the truck from any driving engagement with the engine or to brake the truck by the engine, or quickly release it from this braking action, in which I believe the great advantage of my invention resides.

In order to provide for an additional brake, when necessary, upon the shaft 9 and through this shaft upon the driving wheels, 4, I provide the brake shoe 40 which is connected by a link or arm 41 to a lever 42, pivoted at 43 beneath the beams 2. The other end of this lever is bent upward as at 44, and then rearwardly, and is there provided with a foot-hold 45. This lever is bent upwardly for the purpose of bringing this foot-hold 45 into convenient position for the operator. A latch 46 may be used to hold the lever in its depressed position, and the brake shoe in engagement with the wheel 33. It will be seen that by pressing upon the foot-hold 45, the lever 42 will be turned upon its pivot 43 and the shoe 40 will be drawn inwardly against the face of the friction wheel 33. This brake while useful in various circumstances, is particularly valuable in connection with the means whereby the movement of the truck may be braked by engagement with the engine as above described. This additional brake 40 permits the truck to be held as, for instance, on a hill without the necessity of stopping the engine. It is also necessary where the truck is to be held stationary, though the engine be operated, as where the driving shaft 13 is to be connected to and drive some piece of agricultural machinery. In this case, of course, the shaft 13 is out of gear with the axle 5, and the axle must be held from rotation by a separate brake. I have shown in dotted lines at 47 a pulley adapted to be slipped upon the projecting end of the driving shaft 13, from which a belt may be carried to operate the mechanism to be driven. It is understood that I do not wish to be limited to the particular form of brake used in this connection, as any form of arrangement can be used for this purpose in conjunction with the mechanism before described.

Having thus described my invention, what I claim as new and desire to secure by Letters-Patent, is:

1. In a vehicle of the class described, the combination of a body, wheels supporting the same, certain of which act as drivers, an engine supported on the body and disposed longitudinally thereof and having a crank shaft extending transversely to the body from one side to the other, a parallel counter shaft, a pinion on the countershaft, a compensating gearing meshing with the pinion and connected with the drivers for rotating the same, a gear rigidly connected with the pinion, a pinion mounted directly on the crank shaft and permanently meshing with the gear, a clutch for connecting the second pinion with the crank shaft, a friction driving wheel on the end of the crank shaft opposite from the pinion thereon, a frictionally driven wheel rigidly secured to the countershaft, an idler for frictionally engaging between the friction driving and driven wheels, and a controlling device for moving the idler into engagement with the wheels while opening the clutch or out of engagement during the closing of the clutch.

2. In a traction engine, a supporting truck, a driven axle and traction wheels thereon, a driving shaft carrying a loose gear at one end and a friction wheel at the other, a counter-shaft having at one end a friction wheel adjacent to but out of engagement with the friction wheel on the driving shaft, and at the other a toothed gear engaging with said loose gear, a toothed gear wheel mounted on the axle and driven from said counter-shaft toothed gear, a clutch mechanism, one member of which is connected to the loose gear and the other to the driving shaft, an intermediate friction gear adapted to be thrown into engagement with both the friction wheel on the driving shaft and that on the counter-shaft, and mechanism for simultaneously operating the clutch and intermediate friction wheel to throw the clutch into engagement with the driving shaft and the intermediate friction wheel out of engagement, or to throw the intermediate friction wheel into engagement and the clutch out of engagement.

3. In a traction engine, an axle, traction wheels, a compensating gear on the axle for rotating the wheels, a driving shaft having a loose toothed wheel at one end, a counter-shaft having toothed gear wheels thereon engaging on one side with the loose gear wheel and on the other with the compensating gear, a friction wheel on the other end of said counter-shaft, a friction clutch having one member thereof attached to the loose gear wheel of the driving shaft and the other member thereof connected to said driving shaft, a friction wheel on the opposite end of the driving shaft adjacent to but not in engagement with the friction wheel on the counter-shaft, an intermediate friction wheel adapted to be engaged with both of said friction wheels to drive the one from the other, a bell crank, to one arm of which one of said clutch members is connected, a rock shaft upon which the intermediate friction wheel is supported, and means for operating said bell crank and rotating the shaft supporting the friction wheel to throw in the clutch and throw the intermediate wheel out of engagement or to throw out the clutch and throw in the intermediate friction wheel.

4. In a traction engine, an axle, and traction wheels thereon, a toothed gear wheel mounted on the axle, a counter-shaft having thereon a toothed gear wheel and a pinion engaging with the toothed gear on the axle, a friction wheel mounted on the other end of said shaft, a driving shaft operated from an engine, a loose gear wheel on one end of said driving shaft engaging with the gear wheel on the counter-shaft, a clutch element attached to the loose gear wheel, a clutch element mounted on the driving shaft to rotate therewith and adapted to be thrown into and out of engagement with the first-named clutch element, a driving friction wheel on the other end of the driving shaft, an intermediate friction wheel adapted to be forced into engagement with the friction wheel on the driving shaft and on the counter-shaft to drive the one from the other, a rock shaft having a crank adapted to actuate the intermediate friction wheel, an arm on the rock shaft, a lever connected to operate said arm, and mechanism actuated by said arm for throwing the movable clutch member into engagement with the clutch member on the loose gear wheel when the intermediate friction wheel is thrown out of engagement with the associated friction wheels and throwing the clutch member out of engagement when said intermediate friction gear is thrown into engagement with the associated friction wheels.

5. In a traction engine, an axle, traction wheels thereon, a toothed gear mounted on said axle, a counter-shaft having a gear wheel engaging with said toothed gear to drive the same, a gear wheel on the other end of said shaft, a driving shaft actuated by the engine, a loose gear thereon at one end engaging with said toothed gearing on the counter-shaft, frictional means for engaging the driving shaft with the gear wheel on one or the other end of the counter-shaft, said frictional means including separate gripping elements, a bell crank lever connected with one of the elements for actuating the same, a rock shaft connected with the other element, and an actuator common to the bell crank lever and rock shaft.

6. In a traction engine, the combination of an axle, traction wheels thereon, a toothed gear mounted on one end of said axle, a countershaft, a toothed gear on one end of said countershaft meshing with the toothed gear on the axle, a gear wheel on the other end of said countershaft, an intermediate gear wheel adapted to be thrown into engagement with said gear wheel on the countershaft, a driving shaft, a gear wheel thereon engaging the intermediate gear wheel, a loose gear on the driving shaft, a toothed gear on the countershaft meshing with said loose gear, means for locking the loose gear to the driving shaft, means for releasing said locking means while throwing the intermediate gear wheel into engagement with the driving shaft to drive the engine backward or forward, or to release the locking means and the intermediate gear wheel to disconnect the driving shaft from the countershaft, and a braking means adapted to be applied when the driving shaft is disconnected from the countershaft.

7. In a traction engine, an axle, traction wheels thereon, a counter-shaft having a gear at one end engaging with said axle to drive the same, a driving shaft actuated by the engine, an intermediate gear adapted to connect one end of the driving shaft with one end of the counter-shaft, a friction clutch adapted to connect the other end of the driving shaft with the other end of the countershaft, and means for simultaneously moving the friction clutch into engagement and the intermediate gear out of engagement with said counter-shaft.

In testimony, that I claim the foregoing as my own, I have hereto affixed my signature in the presence of two witnesses.

WILLIAM BENSON.

Witnesses:
DAVID R. WAGNER,
JOHN H. SIGGERS.